US009816532B2

(12) United States Patent
Zhang

(10) Patent No.: US 9,816,532 B2
(45) Date of Patent: *Nov. 14, 2017

(54) ASPIRATOR FOR INTERNAL COMBUSTION ENGINE HAVING INTEGRATED FLOW BYPASS AND CHECK VALVE

(71) Applicant: Ford Global Technologies, LLC, Dearborn, MI (US)

(72) Inventor: Xiaogang Zhang, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 122 days.

This patent is subject to a terminal disclaimer.

(21) Appl. No.: 14/736,929

(22) Filed: Jun. 11, 2015

(65) Prior Publication Data
US 2016/0363139 A1    Dec. 15, 2016

(51) Int. Cl.
| | |
|---|---|
| *F02D 1/08* | (2006.01) |
| *F04F 5/16* | (2006.01) |
| *F02M 35/104* | (2006.01) |
| *F04F 5/46* | (2006.01) |
| *F04F 5/48* | (2006.01) |
| *B60T 13/46* | (2006.01) |
| *B60T 17/02* | (2006.01) |
| *F02M 35/10* | (2006.01) |

(52) U.S. Cl.
CPC ............ *F04F 5/16* (2013.01); *B60T 13/46* (2013.01); *B60T 17/02* (2013.01); *F02M 35/104* (2013.01); *F02M 35/10242* (2013.01); *F04F 5/461* (2013.01); *F04F 5/48* (2013.01)

(58) Field of Classification Search
CPC .............................................. F02M 35/10229

USPC ................ 123/320, 327, 184.53, 389
See application file for complete search history.

(56) References Cited

U.S. PATENT DOCUMENTS

| | | | |
|---|---|---|---|
| 1,820,884 A | 8/1929 | Hueber et al. | |
| 4,380,418 A | 4/1983 | Crawford et al. | |
| 8,047,185 B2 | 11/2011 | Ulrey et al. | |
| 2013/0340732 A1 | 12/2013 | Pursifull et al. | |
| 2014/0014080 A1 | 1/2014 | Beshay et al. | |
| 2014/0123941 A1* | 5/2014 | Ulrey ............... | F02M 35/10229 123/350 |
| 2015/0159665 A1* | 6/2015 | Fletcher ............. | F04D 27/0215 415/58.4 |
| 2015/0204283 A1* | 7/2015 | Vanderwege .... | F02M 35/10144 123/445 |

(Continued)

*Primary Examiner* — John Kwon
(74) *Attorney, Agent, or Firm* — LeClairRyan

(57) ABSTRACT

An aspirator for a brake system is provided having integrated functions of a flow bypass and a check valve for automotive applications to achieve various suction flow openings in response to different engine operating conditions to enhance brake boost performance. The brake system includes a brake vacuum booster, an engine having an intake manifold, an aspirator having a movable convergence nozzle, the aspirator being connected to the manifold, and a vacuum line connecting the booster to the aspirator. The aspirator includes a body having an interior end wall. A biasing element such as a spring is provided between the movable convergence nozzle and the interior end wall of the aspirator body. The body of the aspirator has an air flow path having an upstream area and a downstream area. The movable convergence nozzle is positioned in the upstream area of the flow path.

20 Claims, 4 Drawing Sheets

(56) References Cited

U.S. PATENT DOCUMENTS

2016/0061160 A1* 3/2016 Fletcher ........... F02M 35/10229
   417/159
2016/0245236 A1* 8/2016 Graichen ......... F02M 35/10229
2016/0356248 A1* 12/2016 Zhang ...................... F04F 5/16

* cited by examiner

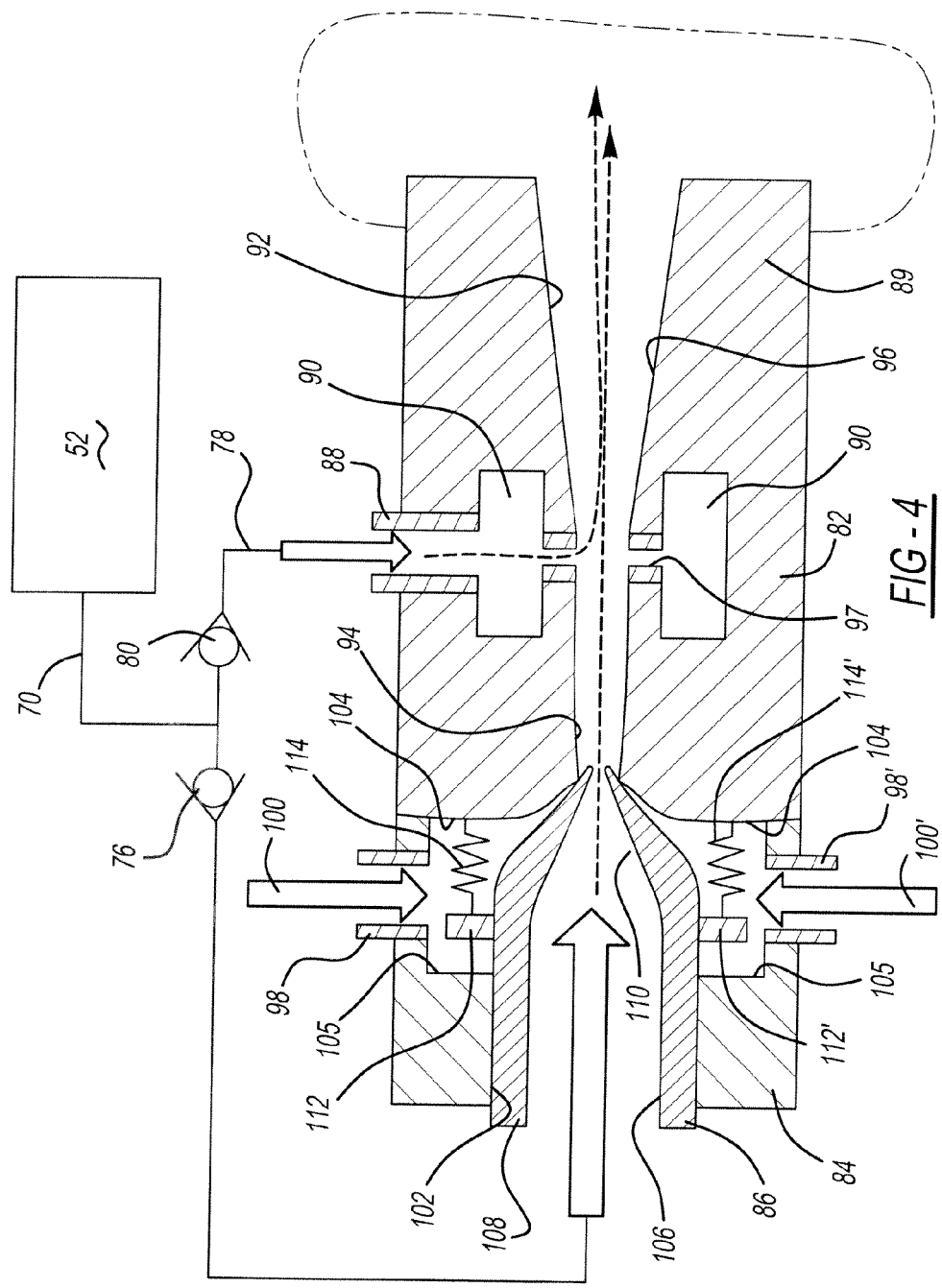

ASPIRATOR FOR INTERNAL COMBUSTION ENGINE HAVING INTEGRATED FLOW BYPASS AND CHECK VALVE

TECHNICAL FIELD

The disclosed inventive concept relates generally to intake manifolds for internal combustion engines. More particularly, the disclosed inventive concept relates to an aspirator having integrated functions of a flow bypass and a check valve to enhance brake boost performance.

BACKGROUND OF THE INVENTION

Brake systems for vehicles rely on a vacuum brake booster connected to the vehicle's intake manifold. The total air flow rate into the intake manifold at engine idle and low load conditions can be difficult to control. A typical response to this situation is to provide a control valve having an expensive electric actuator. The control valve and control system is needed to shut down motive flow during engine low load and idle conditions.

Another response to this situation is to position an aspirator between the vacuum brake booster and the manifold. The aspirator provides a narrow flow introduction gap from the air suction flow to the main flow (the motive flow) that functions at a low vacuum pressure all the way to negative 60 kPa.

Under some engine operation conditions (such as during engine idle), pressure inside the brake boost tank may be higher than intake manifold. The narrow gap of the aspirator prevents a high flow rate from the boost tank to the intake manifold. Accordingly, a separate flow bypass is required to quickly flow air out of brake boost tank to achieve desired performance.

The separate flow bypass required by known brake arrangements introduces an additional component that adds cost to the arrangement. In addition, the requirement for the separate flow bypass introduces another element into the vehicle braking system that is subject to failure. Furthermore, the addition of a separate flow bypass adds an additional challenge to engine compartment packaging.

Thus, known brake systems that include aspirators are subject to improvement. Accordingly, a brake system for use with a vehicle that provides an advantage over known systems remains wanting.

SUMMARY OF THE INVENTION

The disclosed inventive concept overcomes the problems associated with known brake boost systems. In general, the disclosed inventive concept provides an aspirator for a brake system having integrated functions of a flow bypass and a control valve for automotive applications to achieve various suction flow openings in response to different engine operating condition to enhance brake boost performance.

The disclosed inventive concept provides a brake system for a vehicle that includes a brake vacuum booster, an engine having an intake manifold, an aspirator having a movable convergence nozzle, the aspirator being connected to the manifold, and a vacuum line connecting the booster to the aspirator. The aspirator includes a body having an interior end wall. A biasing element such as a spring is provided between the movable convergence nozzle and the internal end wall of the aspirator body.

The body of the aspirator has an air flow path having an upstream area and a downstream area. The movable convergence nozzle is positioned in the upstream area of the flow path. The aspirator is connected to the intake manifold at an inlet boss.

The disclosed inventive concept achieves a reduction in production costs by eliminating the bypass flow passage and the associated check valve by providing a sufficient suction flow rate under low vacuum pressure conditions.

The above advantages and other advantages and features will be readily apparent from the following detailed description of the preferred embodiments when taken in connection with the accompanying drawings.

BRIEF DESCRIPTION OF THE DRAWINGS

For a more complete understanding of this invention, reference should now be made to the embodiments illustrated in greater detail in the accompanying drawings and described below by way of examples of the invention wherein:

FIG. 4 illustrates a sectional view of the integrated multi-function aspirator according to the disclosed inventive concept under a deep vacuum condition.

DETAILED DESCRIPTION OF THE PREFERRED EMBODIMENT

As those of ordinary skill in the art will understand, various features of the embodiments illustrated and described with reference to any one of the Figures may be combined with features illustrated in one or more other Figures to produce alternative embodiments that are not explicitly illustrated or described. The combinations of features illustrated provide representative embodiments for typical applications. However, various combinations and modifications of the features consistent with the teachings of the present disclosure may be desired for particular applications or implementations.

Figure 1:
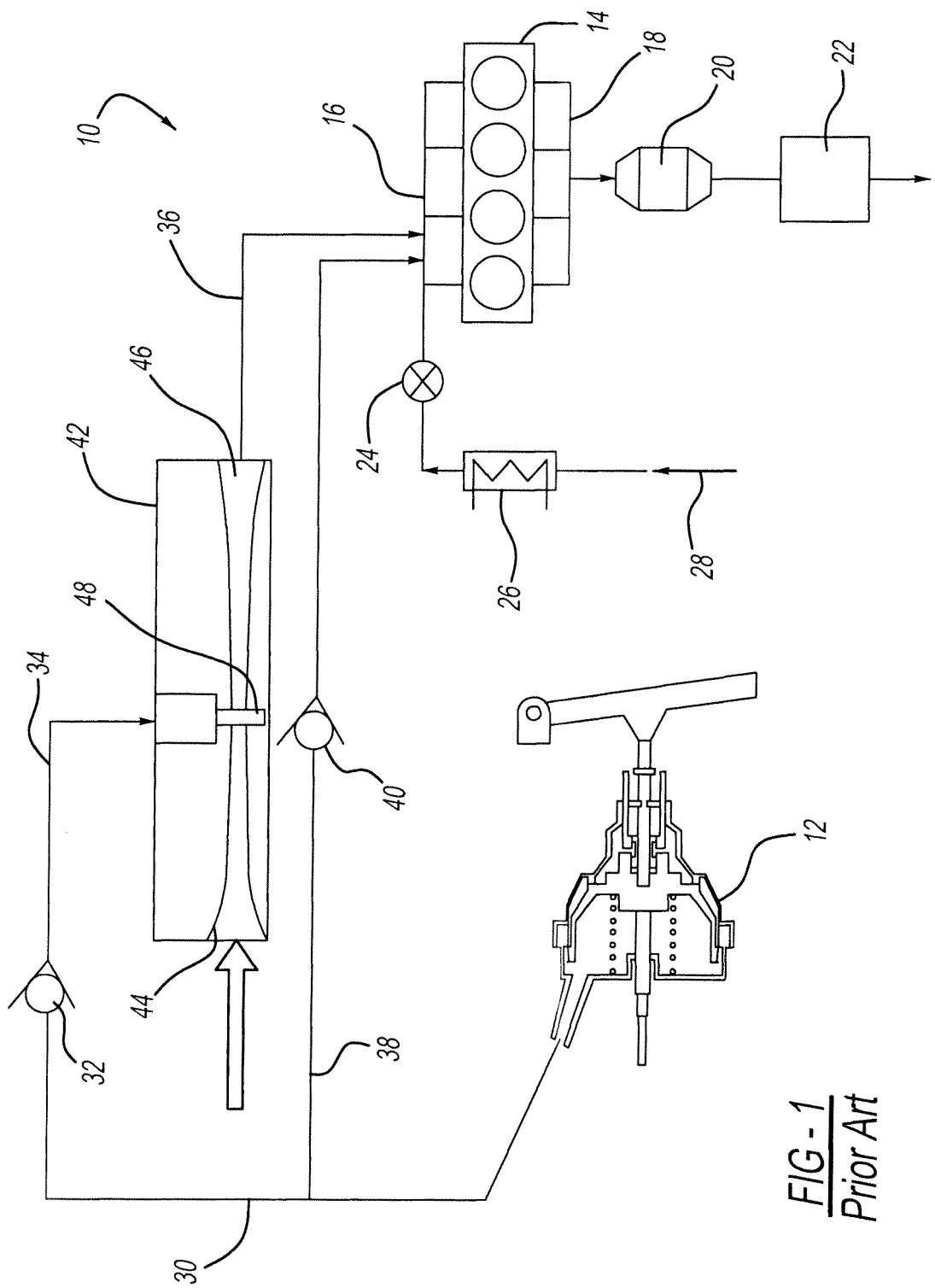
FIG. 1 is a diagrammatic illustration of an existing arrangement of an aspirator in relation to a brake booster and the intake manifold of a vehicle engine.
Figure 2:
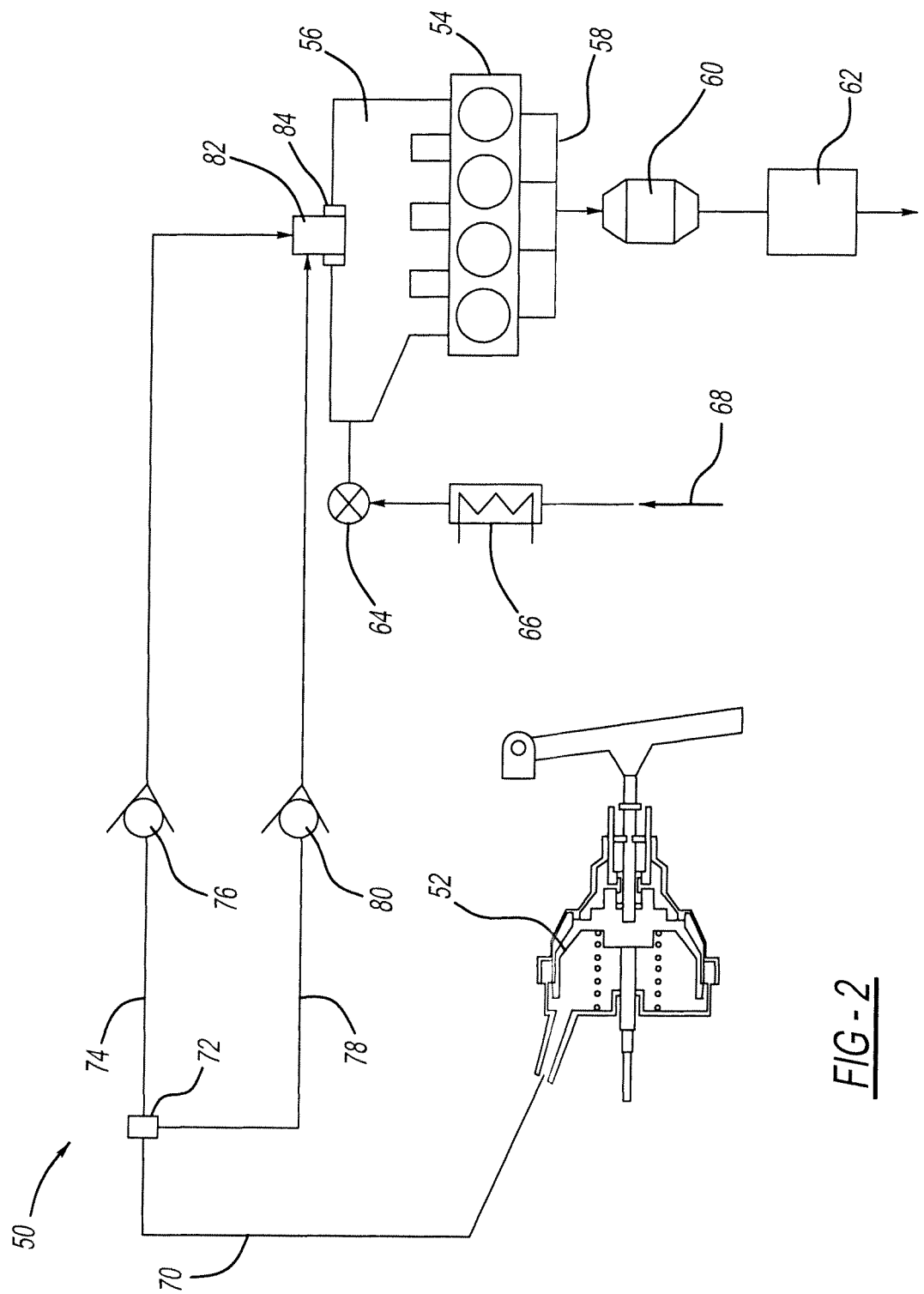
FIG. 2 is a diagrammatic illustration of an arrangement of an aspirator according to the disclosed inventive concept in relation to a brake booster and the intake manifold of a vehicle engine
Figure 3:
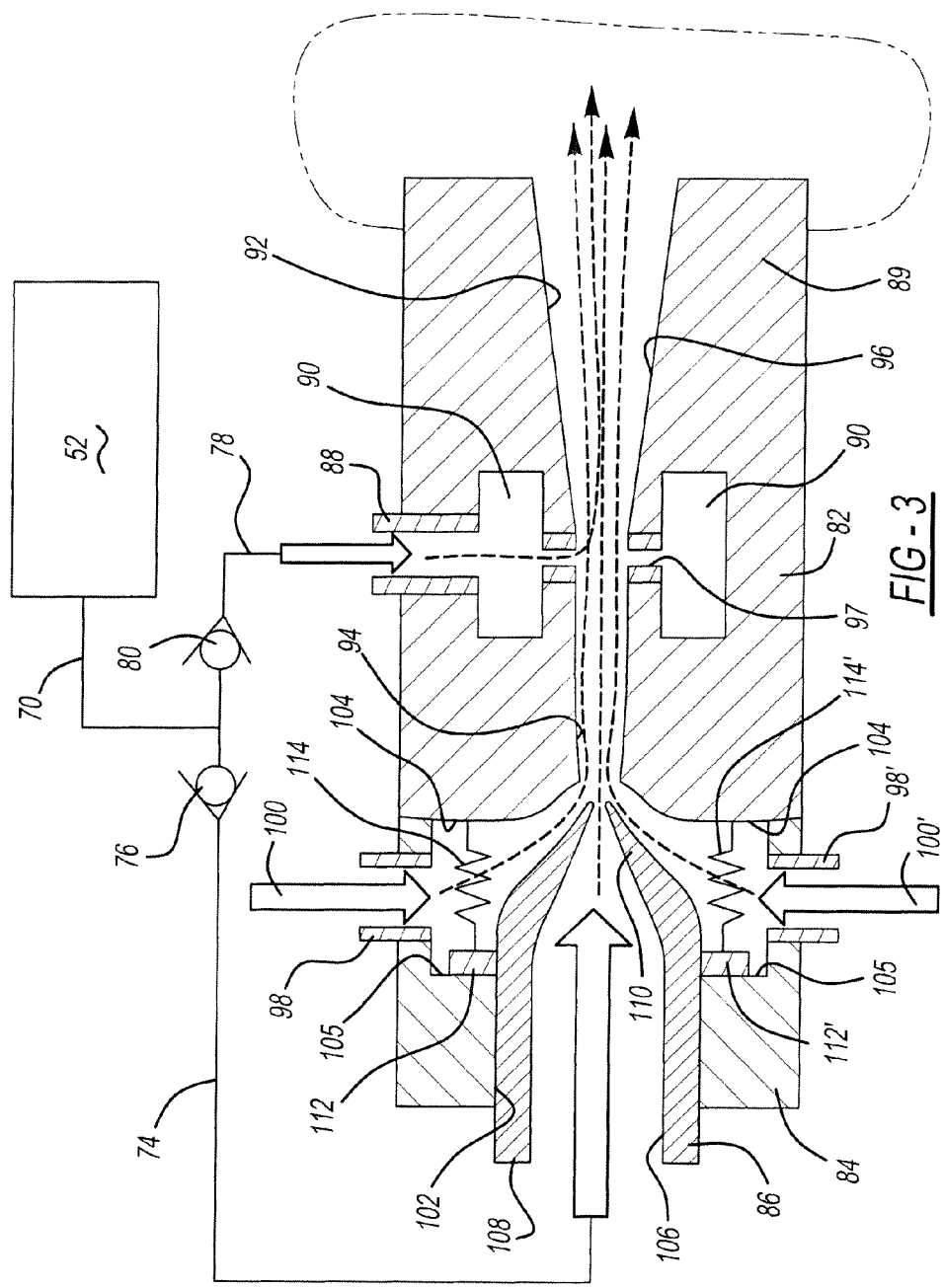
FIG. 3 illustrates a sectional view of an integrated multi-function aspirator according to the disclosed inventive concept under normal operating conditions.

FIG. 1 illustrates a traditional and known brake boost system layout while FIGS. 2 through 4 illustrate the brake boost and aspirator according to the disclosed inventive concept. It is to be understood that the arrangement and illustrated shapes of the components of the disclosed inventive concept are suggestive and are not intended as being limiting as other variations of the disclosed inventive concept may be possible without deviating from the spirit and scope of the concept as illustrated, described and claimed.

Referring to FIG. 1, a diagrammatic illustration of an existing arrangement of a brake boost system is illustrated. The system, generally illustrated as 10, includes a vacuum booster assembly 12 and an engine 14 having an intake manifold 16. The engine 14 includes an exhaust manifold 18 associated with a three-way catalytic converter 20 and a muffler 22. The intake manifold 16 is associated with a throttle body 24 and a charge air cooler 26. Ambient air 28 enters the charge air cooler 26 for delivery to the throttle body 24.

Between the vacuum booster assembly 12 and the intake manifold 16 is a flow line 30 having a check valve 32. The flow line 30 includes a booster-to-aspirator portion 34 and an aspirator-to-intake manifold portion 36. Also between the vacuum booster assembly 12 and the intake manifold 16 is a flow bypass line 38 having a check valve 40.

The flow line 30 further includes an aspirator 42. The aspirator 42 includes an aspirator intake end 44 into which ambient, motive flow air enters and an aspirator output end 46. A suction flow introduction gap 48 is formed within the aspirator 42. The suction flow introduction gap 48 is fluidly associated with the booster-to-aspirator portion 34 of the flow line 30. The suction flow introduction gap 48 is also fluidly disposed between the aspirator intake end 44 and the aspirator output end 46.

Referring to FIG. 2, a diagrammatic illustration of a brake boost system incorporating the aspirator design according to the disclosed inventive concept is illustrated. The system, generally illustrated as 50, includes an engine 54 having an intake manifold 56. The engine 54 includes an exhaust manifold 58 associated with a three-way catalytic converter 60 and a muffler 62. The intake manifold 56 is associated with a throttle body 64 and a charge air cooler 66. Ambient air 68 enters the charge air cooler 66 for delivery to the throttle body 64.

Between the vacuum booster assembly 52 and the intake manifold 56 is a vacuum booster flow line 70 having a flow line split 72. The flow line split 72 divides the flow line into two flow paths, a primary vacuum booster flow path 74 having a primary vacuum booster flow path check valve 76 and a secondary vacuum booster flow path 78 having a secondary vacuum booster flow path check valve 80.

Both the primary vacuum booster flow path 74 and the secondary vacuum booster flow path 78 are fluidly connected to an aspirator 82 having integrated flow bypass and control valve functions according to the disclosed inventive concept. The aspirator 82 is attached to the intake manifold 56 by a mounting boss 84 attached to the intake manifold 56 by, for example, welding. The aspirator 82 according to the disclosed inventive concept avoids the need for a separate flow bypass line as is known in the art and as is discussed above in relation to the prior art illustrated in FIG. 1.

FIGS. 3 and 4 illustrate in section views the aspirator 82 under different operating conditions. Particularly, the aspirator 82 illustrated in FIG. 3 is shown under normal operating conditions in which $P_{vacuum} < P_{manifold}$. In FIG. 4, on the other hand, the aspirator 82 illustrated in FIG. 4 is shown under engine low load and idle conditions in which $P_{vacuum} > P_{manifold}$.

Referring to FIG. 3, the aspirator 82 includes an aspirator body 84 having a primary vacuum inlet 86 attached to the primary vacuum booster flow path 74 and a secondary vacuum inlet 88 attached to the secondary vacuum booster flow path 78. The aspirator body 84 includes a divergence nozzle 89. The primary vacuum inlet 86 and the secondary vacuum inlet 88 provide the vacuum suction flow ($p_{vacuum}$) to the aspirator 82.

The secondary vacuum booster flow path 78 terminates in a cavity 90. The cavity 90 is in fluid relation to a central bore 92 centrally formed within the divergence nozzle 89 having a narrow inlet 94 and a conical outlet 96 via a pathway 97.

The aspirator body 84 further includes a pair of opposed atmosphere inlets 98 and 98' into which streams of ambient air 100 and 100' flow. An air filter (not shown) is attached to the opposed atmosphere inlets 98 and 98'. The opposed atmosphere inlets 98 and 98' are located in the upstream area of the central bore 92.

Formed within the upstream end of the aspirator body 84 is an axial bore 102 having a downstream wall 104 and an opposed upstream wall 105. A movable convergence nozzle 106 is fluidly associated with the primary vacuum inlet 86. The movable convergence nozzle 106 includes a wide inlet end 108 and a narrow, conical outlet end 110. Extending from the movable convergence nozzle 106 are stoppers 112 and 112'. The stoppers 112 and 112' may be of any configuration, such as a ring.

Disposed between the end wall 104 of the axial bore 102 and the stoppers 112 and 112' is a pair of pre-loaded biasing elements 114 and 114'. The pre-loaded biasing elements 114 and 114' are illustrated as being in the form of springs, although other biasing elements would be suitable as well. The movable convergence nozzle 106 is located in the upstream area of the aspirator body 84 while the pre-loaded biasing elements 114 and 114' urge the movable convergence nozzle 106 in the upstream direction.

Under normal operating conditions as illustrated in FIG. 3 where $P_{vacuum} < P_{manifold}$, the movable convergence nozzle 106 is urged away from the downstream divergence nozzle 89 and upstream by the pre-loaded biasing pre-loaded elements 114 and 114' until the stoppers 112 and 112' abut the upstream wall 105. In this position, the movable convergence nozzle 106 is spaced apart from the narrow inlet 94 of the central bore 92 of the divergence nozzle 89. Because of this spacing, an incoming flow of air from both of the opposed atmosphere inlets 98 and 98' is permitted that joins the flow of brake vacuum reservoir air from the primary path 74 entering the primary vacuum inlet 86 as well as from the secondary path 78 entering the secondary vacuum inlet 88. The comingled air enters the intake manifold 56.

As illustrated in FIG. 3, the position of the convergence nozzle 108 results in a pressure difference between the atmosphere and the intake manifold 56 that drives motive flow and creates a low static pressure at the narrow, conical outlet end 110. As the static pressure at the narrow, conical outlet end 110 is lower than the pressure inside of the vacuum booster assembly 52, air inside of the brake reservoir starts to flow through the primary vacuum booster flow path 74 and the secondary vacuum booster flow path 78 towards the intake manifold 56. Accordingly, a vacuum is generated inside of the vacuum booster assembly 52.

However, during other engine operating conditions such as under conditions of very low pressure in the intake manifold 56 where $P_{vacuum} > P_{manifold}$, intake manifold pressure is lower than vacuum pressure inside of the vacuum booster assembly 52. Higher pressure in the movable converge nozzle 106 overcomes the resistive force of the pre-loaded biasing elements 114 and 114' and pushes the movable converge nozzle 106 downstream toward the divergence nozzle 89 until the conical outlet end 110 comes into contact with the narrow inlet 94 of the central bore 92 of the divergence nozzle 89, thus closing shut the motive flow path. As a result of the change of flow path created by movement of the movable convergence nozzle 106 in the downstream direction, air inside of the vacuum booster assembly 52 flows through the primary vacuum booster flow path 74 and the secondary vacuum booster flow path 78 to the intake manifold 56. Force balance can be optimized through resizing of the pre-loaded biasing elements 114 based on engine operation condition and applications.

The disclosed invention as set forth above overcomes the challenges faced by known brake boost systems by eliminating the need for an additional bypass line and by eliminating an expensive control valve and an associated actuator. However, one skilled in the art will readily recognize from such discussion, and from the accompanying drawings and claims that various changes, modifications and variations can be made therein without departing from the true spirit and fair scope of the invention as defined by the following claims.

What is claimed is:

1. A brake system for a vehicle comprising:
a brake vacuum booster;
an engine having an intake manifold;
an aspirator having an axial bore and a divergence nozzle, a portion of said bore being formed through said nozzle, said aspirator being connected to said manifold;
a convergence nozzle movably positioned at least partly in said axial bore; and
a vacuum line connecting said booster to said aspirator.

2. The brake system for a vehicle of claim 1 wherein said aspirator has an air flow path, said path having an upstream area and a downstream area, said movable convergence nozzle being positioned in said upstream area of said flow path.

3. The brake system for a vehicle of claim 2 where said divergence nozzle forms said downstream area of said aspirator.

4. The brake system for a vehicle of claim 1 wherein said aspirator further includes an inlet boss to attach said aspirator to said intake manifold.

5. The brake system for a vehicle of claim 1 wherein said aspirator further includes an interior end wall.

6. The brake system for a vehicle of claim 5 further including a biasing element positioned between said movable convergence nozzle and said interior end wall.

7. The brake system for a vehicle of claim 6 wherein said biasing element is a spring.

8. An aspirator for use in a vehicle brake control system having a brake booster and an intake manifold, said aspirator comprising:
a body;
an ambient air inlet formed in said body;
a vacuum line inlet formed in said body;
an intake manifold attachment port formed in said body; and
a movable convergence nozzle positioned in said body.

9. The aspirator for use in a vehicle brake control system of claim 8 wherein said body has an axial bore.

10. The aspirator for use in a vehicle brake control system of claim 9 wherein at least a portion of said movable convergence nozzle is positioned in said axial bore.

11. The aspirator for use in a vehicle brake control system of claim 9 wherein said divergence nozzle has a conically-shaped bore.

12. The aspirator for use in a vehicle brake control system of claim 9 wherein said body includes an interior end wall, said aspirator further including a biasing element positioned between said interior end wall and said movable convergence nozzle.

13. The aspirator for use in a vehicle brake control system of claim 12 wherein said biasing element is a spring.

14. The aspirator for use in a vehicle brake control system of claim 12 wherein said movable convergence nozzle includes a stopper.

15. The aspirator for use in a vehicle brake control system of claim 14 wherein said biasing element is positioned between said interior end wall and said stopper.

16. An integrated aspirator assembly for a vehicle comprising:
a brake vacuum booster;
an engine having an intake manifold;
a flow path between said booster and said manifold;
an aspirator positioned ins aid flow path, said aspirator including a downstream area; and
a convergence nozzle movably position in said downstream area.

17. The integrated aspirator assembly for a vehicle of claim 16 wherein said aspirator includes an upstream area and said movable convergence nozzle is positioned in said upstream area.

18. The integrated aspirator assembly for a vehicle of claim 16 wherein said aspirator includes a body, said body having an interior end wall.

19. The integrated aspirator assembly for a vehicle of claim 18 further including a biasing element positioned between said movable convergence nozzle and said interior end wall.

20. The integrated aspirator assembly for a vehicle of claim 16 wherein said body has a side wall and includes an ambient air inlet formed on said side wall.

* * * * *